T. Sharp,
Horse Power

Nº 23,954.
Patented May 10, 1859.

UNITED STATES PATENT OFFICE.

T. SHARP, OF BLOOMINGTON, ILLINOIS.

SHAFTING FOR ENDLESS-CHAIN HORSE-POWERS.

Specification of Letters Patent No. 23,954, dated May 10, 1859.

*To all whom it may concern:*

Be it known that I, THEODORE SHARP, of Bloomington, McLean county, and State of Illinois, have invented a new and useful mode of constructing shafting for the use of endless-chain horse-powers used with converge or internal gears for the purpose of changing the gears from one side to the other to make a right or left hand machine; and I do hereby declare that the following is a full, clear, and exact description of the same, reference being had to the accompanying drawings forming part of this specification, in which—

Figure 1:
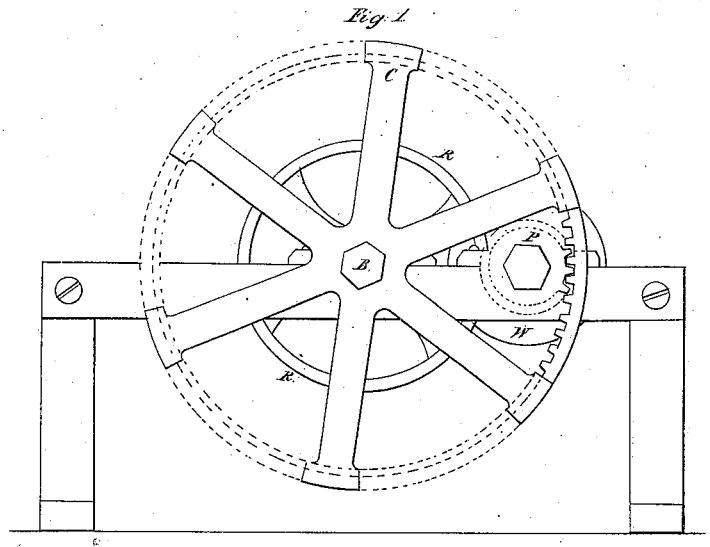
Figure 2:
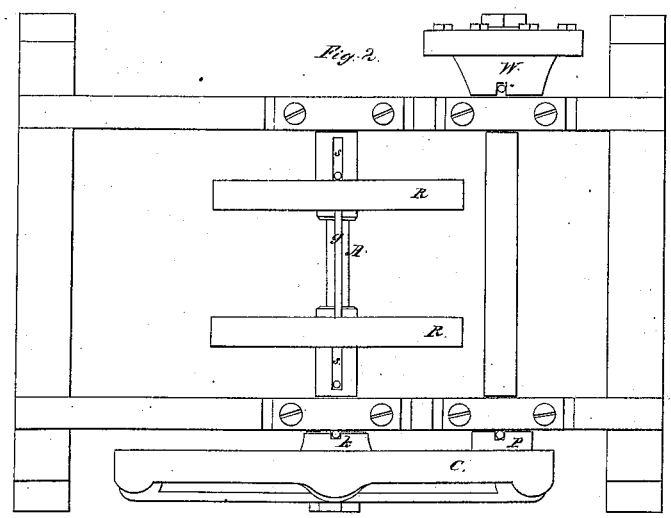
Figure 3:
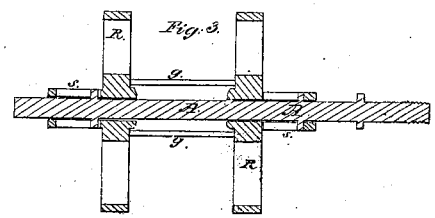

Figure 1 is a perspective view; Fig. 2 side view of reel; Fig. 3 end or elevated view of reel.

The nature of my invention consists in constructing the reel on main shaft with long hubs and mortises in each of a suitable length to allow the main or driving shaft which has pins passing through it so arranged as to correspond with said mortises in hubs of reels to allow the shaft to slide endwise from right to left or left to right, the shaft only projecting one side at a time a suitable length to receive the converge or internal gear pinion or pulley which has long hubs with a notch or slot in their ends corresponding with pin in shaft to prevent them from turning on said shaft. There is also a brace or bar running from one to the other reel to keep them to their places or prevent them from sliding with shaft when moved from one to the other side which can be done at pleasure.

To enable others skilled in the art to make and use my invention I will proceed more fully to describe it.

The horsepower in appearance and general action is much the same as those in ordinary use and differs only so far as will be seen in the following description: A, A, is main or sliding shaft, R, R, reels attached, S, S, mortises or slots through hubs of reels which pins in shaft pass through and prevent from turning of on shaft.

$g$ is brace to keep the reels apart or to their places.

C is converge gear fastened on the projecting end of main shaft.

R is notch in end of hub $c$ which pin in shaft passes through which prevents it from turning on shaft.

B is bolt passing through hub of gear pinion or pulley in the end of shaft which is drilled and a suitable thread cut to correspond with thread on bolt which we draw up holds them securely to their places.

P, is pinion.

W, is pulley on countershaft which receives a fast motion from reel or driving shaft.

From this description it will be seen that shaft A A does not project but one side at a time and by using long hubs on wheels $c$ pulley W and pinion P, I save fastening hubs on all the ends of my shafting which is usually done in powers of this kind and requires much more work and metal than my manner of fastening and are more liable to be broken in using and are often bursted in fastening by keys which strain them very much in addition to the strain caused when at work.

Having thus described my invention I do not claim constructing horsepowers with converge or internal gear (so as to be changed from side to side for the purpose of making a right or left hand machine for that has been done before) but

What I do claim as my invention and desire to secure by Letters Patent is—

The sliding shaft A, A, reels with slotted or mortised hubs R, R, constructed and operating in the manner and for the purpose substantially as described.

THEODORE SHARP.

Witnesses:
 THOS. BIRCH,
 JONATHAN BIRCH.